US006631360B1

(12) United States Patent
Cook

(10) Patent No.: US 6,631,360 B1
(45) Date of Patent: Oct. 7, 2003

(54) COMPUTER-IMPLEMENTABLE INTERNET PREDICTION METHOD

(75) Inventor: Rodney C. Cook, Bothell, WA (US)

(73) Assignee: Sightward, Inc., Bellevue, WA (US)

( * ) Notice: Subject to any disclaimer, the term of this patent is extended or adjusted under 35 U.S.C. 154(b) by 514 days.

(21) Appl. No.: 09/707,547

(22) Filed: Nov. 6, 2000

(51) Int. Cl.[7] .......................... G06F 15/18; G05B 15/00

(52) U.S. Cl. .............................. 706/20; 706/21; 700/83

(58) Field of Search ................... 706/20, 21; 700/83

(56) References Cited

U.S. PATENT DOCUMENTS

2002/0151992 A1 * 10/2002 Hoffberg et al. .............. 700/83

* cited by examiner

Primary Examiner—George B. Davis

(57) ABSTRACT

A computer-implementable method of selecting which engine of a plurality of inference engines to use to predict the categories into which individuals fall, such as buyer/non-buyer, and produce forecast reports based on the predictions is disclosed. Training (known) sample data that categorizes individuals based on the individual's profile is sequentially applied to multiple inference engines to determine which engine is best based on a desired objective. Then, a classifier associated with the selected engine is used to analyze unknown sample data, create category predictions and produce forecast reports based on the predictions.

30 Claims, 14 Drawing Sheets

| CATEGORY | INDIVIDUAL | PROFILE FEATURES | | | | |
|---|---|---|---|---|---|---|
| | | FEATURE 1 | FEATURE 2 | FEATURE 3 | ... | LAST FEATURE |
| CATEGORY A | 1 | | | | | |
| | 2 | | | | | |
| | ... | | | | | |
| | N | | | | | |
| CATEGORY B | 1 | | | | | |
| | 2 | | | | | |
| | ... | | | | | |
| | N | | | | | |
| ... | ... | ... | ... | ... | ... | ... |
| LAST CATEGORY | 1 | | | | | |
| | 2 | | | | | |
| | ... | | | | | |
| | N | | | | | |

Fig. 11

| CATEGORY | INDIVIDUAL | ESTIMATED RELATIVE DENSITY VALUE FOR EACH CATEGORY | | | |
| --- | --- | --- | --- | --- | --- |
| | | CATEGORY A | CATEGORY B | ... | LAST CATEGORY |
| CATEGORY A | 1 | | | ... | |
| | 2 | | | ... | |
| | ... | ... | ... | ... | ... |
| | N | | | ... | |
| CATEGORY B | 1 | | | ... | |
| | 2 | | | ... | |
| | ... | ... | ... | ... | ... |
| | N | | | ... | |
| ... | ... | ... | ... | ... | ... |
| LAST CATEGORY | 1 | | | ... | |
| | 2 | | | ... | |
| | ... | ... | ... | ... | ... |
| | N | | | ... | |

Fig. 12

|  | TRUE CATEGORY | | | |
|---|---|---|---|---|
| PREDICTED CATEGORY | CATEGORY A | CATEGORY B | ... | LAST CATEGORY |
| CATEGORY A | | | | |
| CATEGORY B | | | | |
| ... | | ... | ... | ... |
| LAST CATEGORY | | | | ... |

*Fig. 13*

| | PROFILE FEATURES | | | | |
|---|---|---|---|---|---|
| INDIVIDUAL | FEATURE 1 | FEATURE 2 | FEATURE 3 | ... | LAST FEATURE |
| 1 | | | | | |
| 2 | | | | | |
| ... | ... | ... | ... | ... | ... |
| N | | | | | |

COMPUTER-IMPLEMENTABLE INTERNET PREDICTION METHOD

TECHNICAL AREA

This invention is directed to making predictions and, more particularly, computer-implementable methods of making predictions.

BACKGROUND OF THE INVENTION

Before the development of the Internet, magazines, newspapers, radio, television, catalogs, product shows, and the like were the traditional mediums used to advertise products and services. Advertising utilizing these mediums is typically based on the content of the medium. For example, garden products are typically advertised in a gardening magazine, or at a garden show. Merchants may also send catalogs directly to consumers. Typically, catalogs are sent to consumers who may have purchased a product from the merchant or have purchased a product from a competing merchant. The purpose of advertising, of course, is to place information about a product or service before a likely buyer of the advertised product or service.

In the past, determining in advance whether an advertising campaign is likely to be successful has been limited. While, in some instances, sample advertising campaigns have been conducted before a full advertising campaign has been undertaken, this is more the exception than the rule due to product marketing pressure. Further, it may be impossible to conduct a sample advertising campaign when the advertising medium is national, such as a national magazine or television show. While after-the-fact analyses of the results of an advertising campaign have been conducted in order to improve future advertising campaigns, the cost of the current advertising campaign is lost. Obviously, this is undesirable, particularly if the advertising campaign is unsuccessful. The Internet has the capability of reducing the cost of advertisements by reducing the likelihood that an advertising campaign will be unsuccessful.

Internet users typically view banner advertisements on the World Wide Web ("Web") page they are viewing. These banner ads may either be based on the content of the page they are viewing, or may be based on a profile of the consumer viewing the Web page. As is well known to those familiar with the Internet, consumer profile data is regularly collected both knowingly and unknowingly from consumers when they are connected to the Internet. Some companies ask consumers for profile data, such as age, sex, occupation, nationality, etc. Some of the same companies and other companies collect consumer profile data using "cookies." As is well known to those familiar with the operation of the Internet and the Web, a cookie is a block of data that a Web server stores on a client computer. When a user returns to the same Web site, the browser operating on the client computer sends a copy of the cookie back to the server. Cookies are used to identify users, to instruct a server to send a customized version of a requested Web page, to submit account information for the user, and for other administrative purposes. Thus, cookies allow user profiles to include data such as Web sites visited and past purchases, for example.

The collection of user profile data allows Web pages to be personalized for every user. Therefore, a Web site may send different Web pages to each user, the Web page being designed to enhance the productivity or experience of the user. Personalizing a Web page for different users is intended to direct individual users to the products or services that are of likely interest to that user and that the user may not have accessed without the personalization. The problem, however, is that while Web pages or advertisements may be personalized for users, in the past, there has been no way to accurately predict how users will react to new products or what products the users are likely to purchase and, thus, predict whether an advertising campaign directed to users having a specific profile will be successful.

Many different tools have been developed to predict and identify subpopulations likely to act in a particular manner in response to a particular stimulus. For example, discriminant function analysis has been used to identify subpopulations likely to act in a particular manner in response to particular stimuli. Most discriminate functions are linear or quadratic because they are based on the assumption that the underlying data are normally distributed. However, nonparametric approaches also have been developed. In subpopulation studies the goal is not only to identify an individual for targeting, but to estimate the proportions of intermingled subpopulations that are likely to act in a particular manner in response to particular stimuli.

Unfortunately, none of the previously developed predictive tools (hereinafter called inference engines) are best under all Internet advertising situations. In a particular situation, one inference engine may be better than another. Moreover, there is no presently known way of predicting in advance which inference engine is likely to be better than others in a particular Internet advertising situation.

The present invention is directed to providing a computer-implemented method of selecting an inference engine that is best designed to meet a particular objective, and then using the selected engine to make predictions and forecast reports. While designed for use in connection with Internet advertising and describing a connection with the Internet, it is to be understood that the invention may also find use in other environments.

SUMMARY OF THE INVENTION

As briefly noted above, statisticians have demonstrated that many different analyses can be used to identify subpopulations from a mixed population of individuals. Historically, discriminant functions have been used, many based upon the assumption that the underlying data are normally distributed: namely, linear or quadratic discriminant functions. However, when considering subpopulations of customers or prospects in the business world, it is likely that data will not be distributed normally; hence, for precise identification of a customer or prospect subpopulation, a more expansive approach is needed. At a minimum this problem should be addressed by employing nonparametric approaches, which can be implemented without particular regard to the underlying distributions, together with parametric approaches. As will be better understood from the following summary, the present invention is directed to providing a unified architectural approach with a Bayes decision rule that allows any method to be cast in the same context. This allows direct comparison of algorithms, or inference engines, and immediate deployment of the best approach. Additionally, embodiments of the invention allow sample size requirements to be reduced through employment of a "leaving-n-out" approach. In essence, the invention has the capability of maximizing an arbitrary objective function.

The goal of the invention is not only to identify an individual for targeting, but to estimate the proportions of selected subpopulations in a larger population. This allows comprehensive performance forecasts to be made. For example, the response rate and profit for a list of targeted individuals can be estimated. The invention employs estimated density functions together with a decision array correction procedure to estimate these proportions from a set of linear relationships. The estimated density functions and the decision array that are determined as best at achieving a desired objective are persisted.

In accordance with this invention, a computer-implementable method of selecting which inference engine of a plurality of inference engines to use to create an estimated density function and a decision array for predicting the categories into which individuals fall, such as an Internet buyer/non-buyer, and produce forecast reports based on the predictions is provided. The computer-implementable method comprises a training process and an unknown sample data analysis process. The training process employs training (known) sample data that categorizes individuals based on the individuals' profile features. The training sample data is sequentially applied to multiple inference engines to determine which engine is best based on a desired objective. Preferably, each inference engine is tested several times using different sets of individual profile features. A decision array and estimated density function associated with the best engine and the best set of features is then used during the unknown sample data analysis process to create predictions and forecast reports based on the predictions.

In accordance with other aspects of this invention, the training process involves identifying a data source for each category, establishing a training sample set and creating and storing a training data structure. After the training data structure is created and stored, the data structure is analyzed.

In accordance with further aspects of this invention, the training data structure is analyzed using a leaving-n-out approach. First a category is selected. Next, n selected individuals' related data is removed from the training data structure. Then, a density function is estimated and a density value is calculated for each category based on the training data structure with the selected individual's data removed. The selected individual's data is reinserted into the training data structure and the foregoing sequence is repeated for another individual. After a density function has been estimated and a density value calculated for each category for each individual with the individual's data removed, the entire sequence is repeated for the next category. Processing continues until all categories have been analyzed. The value of n can vary from 1 up to half of the individuals comprising the training data structure.

In accordance with still further aspects of this invention, the calculated density values are used to create a density value data structure. Then, for each category and each individual, a decision rule is applied to the density value data structure for the individual. The results are used to create a decision array. After completion, the decision array is displayed so that a user can determine if the objective has been met.

In accordance with further aspects of this invention, if the objective is changed by the user, the objective may be reset and the training process repeated.

In accordance with still other aspects of this invention, if the objective has been met, the decision array and the estimated density function are stored.

In accordance with yet other aspects of this invention, an engine selection is made based on which engine's results best achieve the desired objective.

In accordance with yet still other aspects of this invention, the decision array and estimated density function associated with the selected engine are applied to an unknown sample data structure created from the unknown sample data to obtain prediction data that is used to create forecast reports.

As will be readily appreciated from the foregoing summary, the invention provides a computer-implemented method of selecting the best inference engine to meet a desired objective. The invention is ideally suited for use in forecasting the likelihood that particular Internet advertising campaign will be successful, i.e., determining if a product or service to be advertised will be purchased by a sufficient number of individuals whose Web page is personalized to receive advertising information about the product or service. In addition to buyers/non-buyers, the invention can be utilized to predict other types of responses such as clicker vs. skipper, respondent vs. non-respondent. The invention can also be utilized in other environments to predict results, such as sick vs. healthy (medical diagnosis), or friend v. foe (weapons systems). Generally speaking, particularly when applied to the Internet, the invention can be used to predict the proportions of a subpopulation in a larger population likely to respond to a particular stimulus in a particular manner.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 11 is an example of a training data structure;

FIG. 12 is an example of a density value data structure;

FIG. 13 is an example of a decision array; and

FIG. 14 is an example of an unknown data structure.

DETAILED DESCRIPTION OF THE PREFERRED EMBODIMENT

As will be better understood from the following description, the presently preferred embodiment of the invention is embodied at least in part in a World Wide Web ("Web") site accessible via the Internet. In order to make the preferred embodiment of the invention more easily understood prior to describing the preferred embodiment of the invention, a brief description of the Internet and some of the elements of Web sites is set forth.

Figure 1:
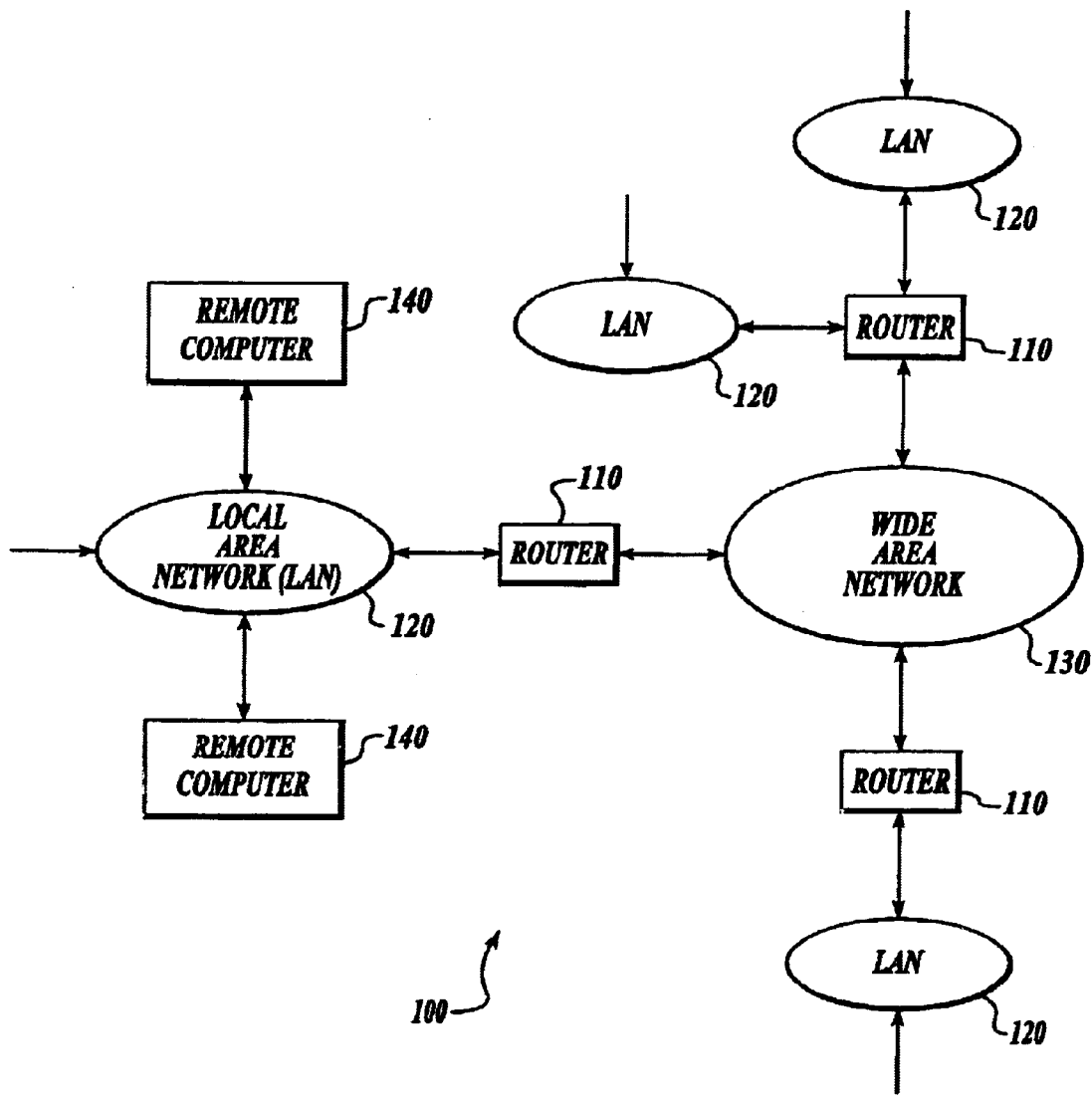
FIG. 1 is an exemplary illustration of a portion of the Internet.
Figure 2:
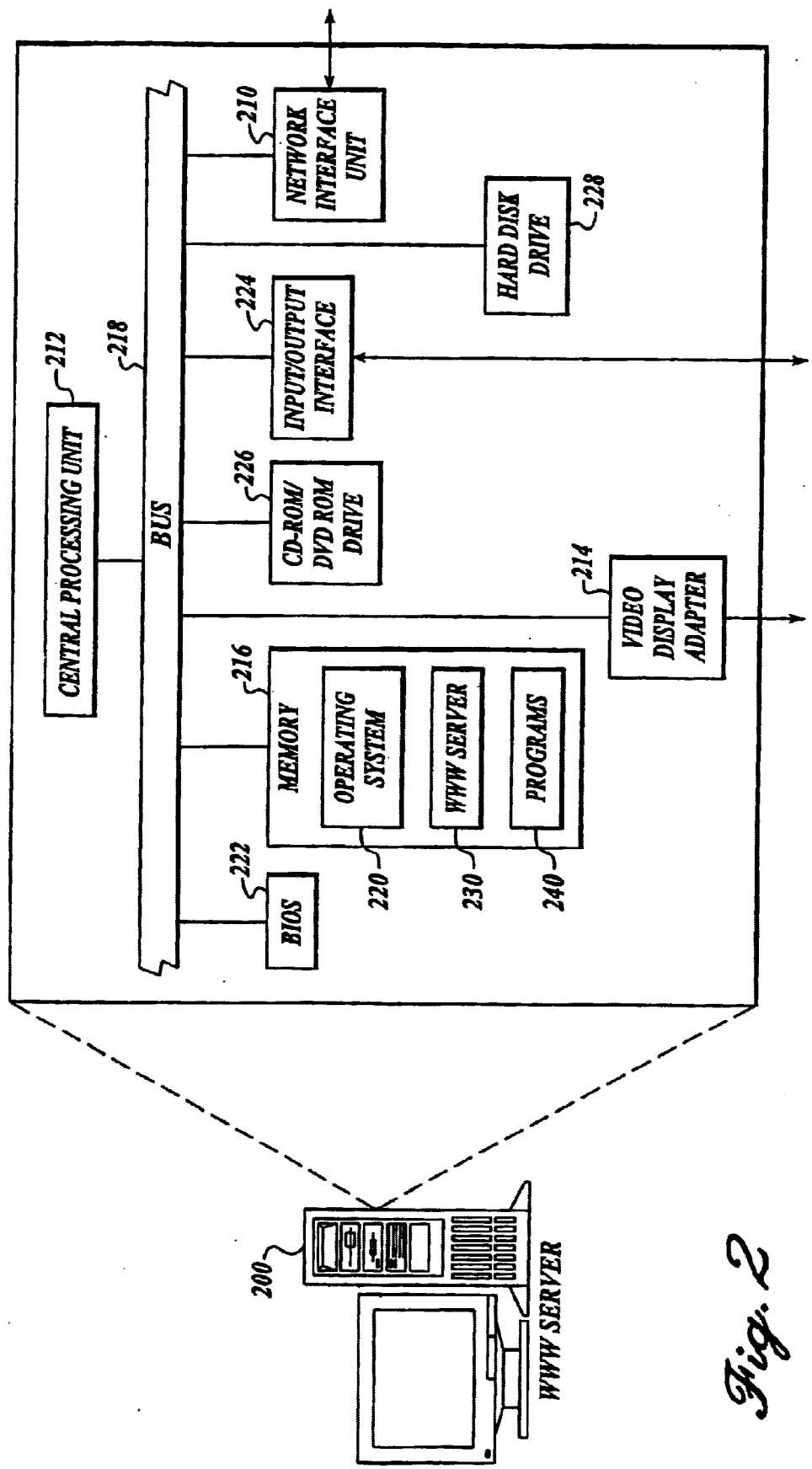
FIG. 2 is a block diagram illustrating several of the components of a World Wide Web ("Web") server.
Figure 3:
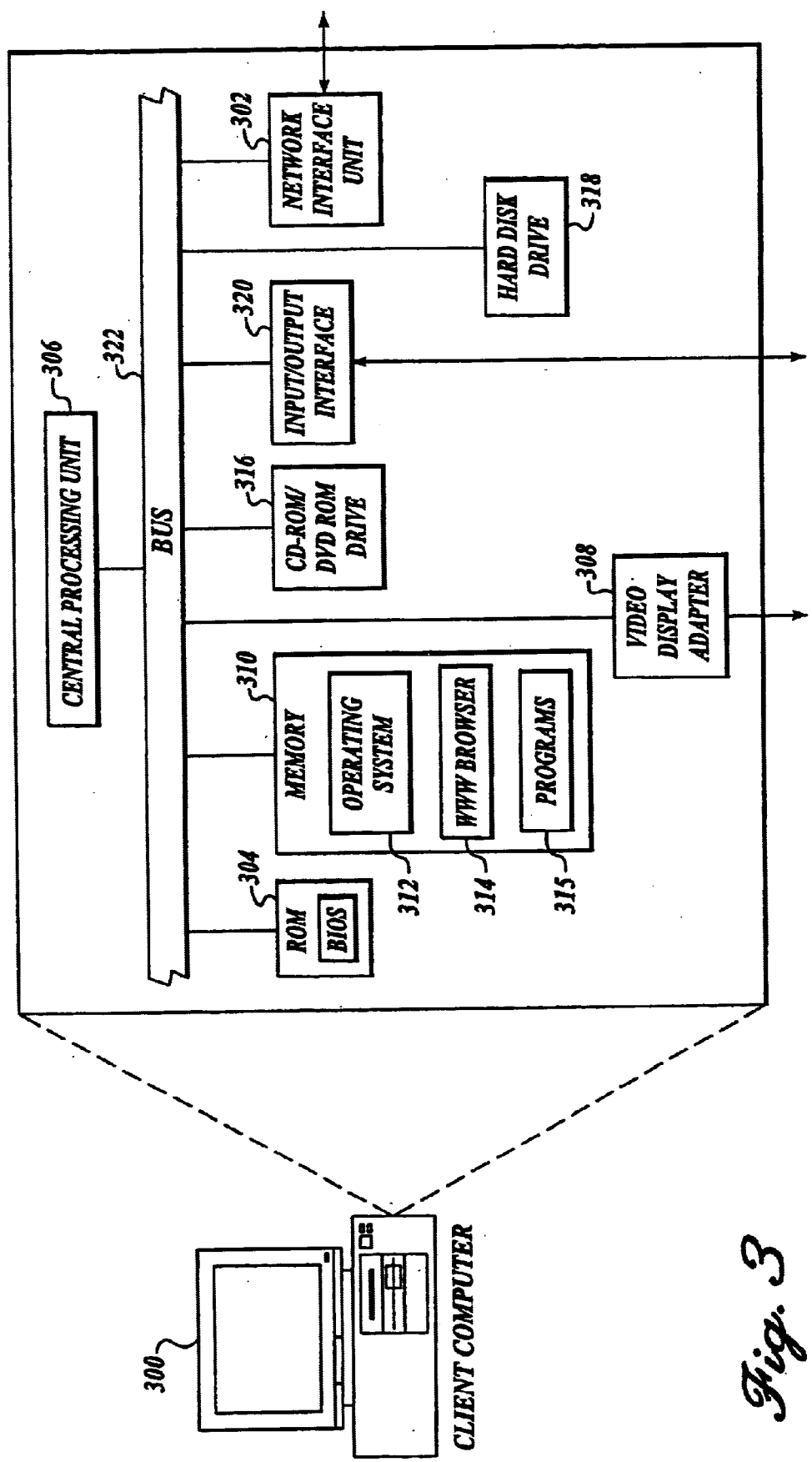
FIG. 3 is a block diagram illustrating several of the components of a Web client computer.

As is well known by those familiar with the Internet, the term "Internet" refers to a collection of networks and routers that use the Transmission Control Protocol/Internet Protocol (TCP/IP) to communicate with one another. A representative section of the Internet 100 is shown in FIG. 1. FIG. 1 includes a plurality of local area networks (LANs) 120 and one or more wide area networks (WANs) 130 interconnected by routers 110. Routers 110 are special purpose computers used to interface one LAN or WAN to another LAN or WAN. Communication links within LANs or WANs may be twisted wire, or coaxial cable, while communication links between networks may utilize analog telephone lines, digital lines, or other communication links well known to those familiar with the Internet. Furthermore, computers such as remote computers 140, and other related electronic devices, such as telephones, personal assistants, etc., can be remotely connected to either a LAN 120 or WAN 130 via a modem (not shown) or a temporary communication link, such as a telephone line or wireless connection. Remote computers 140 may take the form of servers and function as Web sites or as clients that include Web browsers. Examples of Web server and client computers are illustrated in FIGS. 2 and 3 and described more fully below.

As will be readily appreciated by those familiar with the Internet, only a small portion of the Internet 100 is illustrated in FIG. 1. The Internet 100 comprises a vast number of interconnected networks, computers, and routers.

The Internet has recently seen explosive growth by virtue of its ability to link computers located around the world. As the Internet has grown, so has the Web. As will be readily appreciated by those familiar with the Web, the Web is a vast collection of interconnected or "HyperText" documents written in HyperText Markup Language (HTML), or other markup languages, that are electronically stored at Web sites throughout the Internet. A Web site is a server computer connected to the Internet that has storage facilities for storing HyperText documents and runs administrative software for handling requests for the stored HyperText documents. A HyperText document normally includes a number of hyperlinks, usually displayed on a monitor as highlighted portions of text, which link the document to other HyperText documents stored at the same Web site or some other Web site located elsewhere on the Internet. Each hyperlink is associated with a uniform resource locator (URL) that provides the exact location of the linked document on the server connected to the Internet and describes the document. Thus, whenever a HyperText document is retrieved from any Web site, the document is considered to be retrieved from the Web. As is known to those skilled in the Internet art, a Web server may also include facilities for storing and transmitting application programs, such as application programs written in the Java® programming language from Sun Microsystems for execution on a remote computer. Likewise, a Web server may also include facilities for executing scripts and other application programs on the Web server itself.

A user may retrieve HyperText documents from the Web via a browser application program. A Web browser, such as Netscape's Navigator or Microsoft's Internet Explorer, is a software application program for providing a graphical user interface with the Web. Upon request from the consumer via the Web browser, the Web browser accesses and retrieves desired HyperText documents from the appropriate Web server using the URL for the document in the protocol known as the HyperText Transfer Protocol (HTTP). HTTP is a higher level protocol than TCP/IP and is designed specifically for the requirements of the Web. It is used on top of TCP/IP to transfer HyperText documents between server computers and client computers running a Web browser. A Web browser may also retrieve application programs from a Web server, such as Java applets, for execution on a client computer.

FIG. 2 depicts several of the components of a Web server 200. Those of ordinary skill in the Internet communications art will appreciate that an actual Web server will normally include many more components than those shown in FIG. 2. However, it is not necessary that all of these generally conventional components be shown in order for the present invention to be understood.

The Web server 200 shown in FIG. 2 is connected to the Internet 100 or other communication network, via a network interface unit 210. The network interface unit includes the necessary circuitry for connecting the Web server to the Internet 100 (FIG. 1) and is constructed for use with the TCP/IP protocol. The illustrated Web server 200 also includes a central processing unit (CPU) 212, a video display adapter 214, a memory 216, connected together via a bus 218. The memory 216 generally comprises a RAM, ROM, and a permanent mass storage device, such as a hard disc drive, tape drive, optical drive, floppy disc drive, or combination thereof. The memory 216 stores an operating system 220 for controlling the operation of the Web server 200. It will be appreciated that the operating system may be formed by any one of several general purpose server operating systems as well known to those of ordinary skill in the computer arts, such as UNIX, Linux™, or Microsoft Windows NT®. A binary input/output system ("BIOS") 222 is also provided for controlling the initial startup and low-level operation of the Web server 200.

The memory 16 stores the program code in data for providing a Web site. More specifically, the memory 216 stores a Web server application program 230 and other application programs 240 known to those skilled in the art.

The illustrated Web server 200 also comprises an input/output interface 224 for communicating with external devices, such as a mouse, keyboard, scanner, or other input device (not shown). The Web server 200 may further comprise additional mass storage devices such as a CD-ROM/DVD-ROM drive 226 and hard disc drive 228. As will be better understood from the following description of the preferred embodiment of the present invention, hard disc drive 228 may be utilized by the Web server application program 230 to store several databases. In particular, training data or unknown sample data may be stored for retrieval by the Web server application program 230.

FIG. 3 depicts several of the key components of a client computer 300. Those of ordinary skill in the art will appreciate that the client computer 300 includes many more components than those shown in FIG. 3. However, it is not necessary that all of these generally conventional components be shown in order for the present invention to be understood. As shown in FIG. 3, the illustrated client computer 300 includes a network interface unit 302 for connecting to a LAN or WAN, or for connecting remotely to a LAN or WAN. As will be appreciated by those of ordinary skill in the art, the network interface unit 302 includes the necessary circuitry for such a connection, and is also constructed for use with the TCP/IP protocol. The coupling medium depends on the particular network configuration of the LAN or WAN to which the client computer is connecting. Alternatively, the network interface unit 302 may be capable of connecting to the Internet through a point-to-point (PPP) connection or an SLIP connection as known to those skilled in the art.

The client computer 300 also includes a ROM BIOS 304, a central processing unit 306, a video display adapter 308, and memory 310. The memory 310 generally comprises random access memory (RAM) and read-only memory (ROM). The client computer 300 also includes one or more permanent mass storage devices, such as a hard disc drive 318, or a CD-ROM/DVD-ROM drive 316. Alternatively, or in addition, the client computer may include a floppy disc drive (not shown). The memory 310 stores an operating system 312 for controlling the operating of the client computer 300. The memory 310 also includes a Web browser 314, such as Netscape's NAVIGATOR® browser or Microsoft's INTERNET EXPLORER® browser, for accessing the Web; and one or more applications programs 315. As will be appreciated by those familiar with client computers, these components may be stored in a permanent mass storage device and loaded into the memory 310 of the client computer 300 using a drive mechanism associated with the permanent mass storage device, i.e., the floppy drive (not shown), the CD-ROM/DVD-ROM drive 316, or the hard drive 318. A graphic image may also be stored on the hard drive 318 for transmission to the Web server 200. An input/output interface 320 may be provided for receiving input from a mouse, keyboard, or other input device (not shown). The network interface unit 302, the ROM-BIOS 304, the video display adapter 308, the memory 310, the CD-ROM/DVD-ROM drive 316, the hard disc drive 318, and the input/output interface 320 are all connected to the central processing unit 306 via a bus 322. Other peripherals may also be connected to the central processing unit 306 in a similar manner. The Web browser 314 may utilize a Java virtual machine to execute Java "applets" as known to those skilled in the art.

In recent years, the Internet has become a viable medium for selling products from businesses to consumers (B to C commerce) and from businesses to businesses (B to B commerce). Banner advertisements are often sent to consumers and business purchasers as part of the Web page they are viewing. More specifically, in operation, Internet users, such as consumers and business purchasers, access the Web by enabling the Web browser program 314 stored on the user's client computer. The browser includes a graphical user interface (GUI) that opens when the browser is enabled. Browser GUIs typically contain banner advertisements that may be universal or based on a profile of the user. In any event, typical browser GUIs include a list of the user's favorite Web sites and access to one or more search engines. The list of favorite Web sites includes the universal resource locators (URLs) of Web sites that a user wants to store for easy return. The Web site favorites typically include Web sites of businesses that have products of potential interest to the user such as a business's home page, a business product description page, Internet and/or sites, etc. Rather than being visually observable, the URLs of the Web site favorites are usually "hidden," and instead a more user-friendly identifier, such as a company name, is displayed. When a user clicks on a favorite Web site, the hidden URL causes the user to "jump" to the page identified by the URL. The URL linked page may include banner advertisements that are universal or tailored to the user. The linked page also may include additional links to other pages that also include banner advertisements that again may be universal or tailored to the user.

Advertisements are tailored or personalized to users by collecting user profile data. As well known to those familiar with the Internet, user profile data is regularly collected from users with and without their knowledge when users are connected to some Internet Web pages. Some businesses ask for user profile data such as age, sex, occupation, income, hobbies, areas of interest, etc. Some of the same businesses and other businesses collect user profile data using "cookies." A cookie is a block of data that a Web server stores on a client computer. When a user returns to the same Web server the user's browser sends a cookie back to the server. Cookies are used to identify users, to instruct a server to send a customized version of a Web page, to submit account information from the user and for other administration purposes.

The collected user profile data is stored in databases on the Web servers of the businesses collecting the data or databases of other businesses hired to collect the user profile data. The purpose of the collection is to enhance the ability to help customers and to help encourage users to purchase the goods and/or services of the business collecting the user profile data.

The present invention is directed to a computer-implemented method of analyzing user profile data in order to improve the forecasting of the results of banner and other types of Web advertisements. While the invention will likely find its primary use in connection with Internet Web advertisements, the invention may also find use in other ways, particularly in connection with the Web. For example, as will be better understood from the following description, the invention could be used to forecast other Web activities, such as responses to e-mail inquiries. Of course, it will be understood that the invention could also be used to predict activities in more traditional venues, such as direct mail or products in catalogues.

Many different tools have been developed to predict and identify subpopulations likely to act in a particular manner in response to a particular stimulus. For example, discriminate function analyses have been used to identify subpopulations likely to act in a particular manner in response to particular stimuli. Most discriminate functions are linear or quadratic because they are based on the assumption that the underlying data are normally distributed. However, nonparametric approaches have been developed. In subpopulation studies the goal is usually not to identify an individual, but to estimate the proportions of intermingled subpopulations that are likely to act in a particular manner in response to particular stimuli.

Unfortunately, none of the previously developed predictive tools (hereinafter called inference engines) are best under all Web Internet advertising situations. Often one inference engine is better than another.

As will be better understood from the following description, the present invention is directed to providing a computer-implementable method of selecting which inference engine of a plurality of inference engines to use to create a classifier for predicting the categories into which individuals communicating with one another over a network, such as the Internet, fall and produce forecast reports based on the predictions. The engine can be selected based on various objectives. In most instances, the objective will be maximum predictive accuracy. An example of an alternative objective is minimizing the rate of misclassification from one category, e.g., buyer, to another category, e.g., non-buyer. An example of another alternative objective is balancing the errors among categories in order to maximize some gain. This can be effected by associating a loss with each incorrect decision and a gain with each correct decision.

As will be better understood from the following description, the invention is architected with Bayes Rule as a framework. Bayes Rule effectively says that for a particular individual observation, assign that observation to the category to which the individual has the maximum probability of belonging.

As also will be better understood from the following description, the invention involves sequentially applying training (known) sample data that categorizes individuals based on the individuals' profiles to multiple inference engines to determine which engine is best based on a desired objective. A classifier associated with the selected engine generated during the training sample data analysis part of the method is used to analyze unknown sample data to create predictions and forecast reports based on the predictions.

Figure 4A:
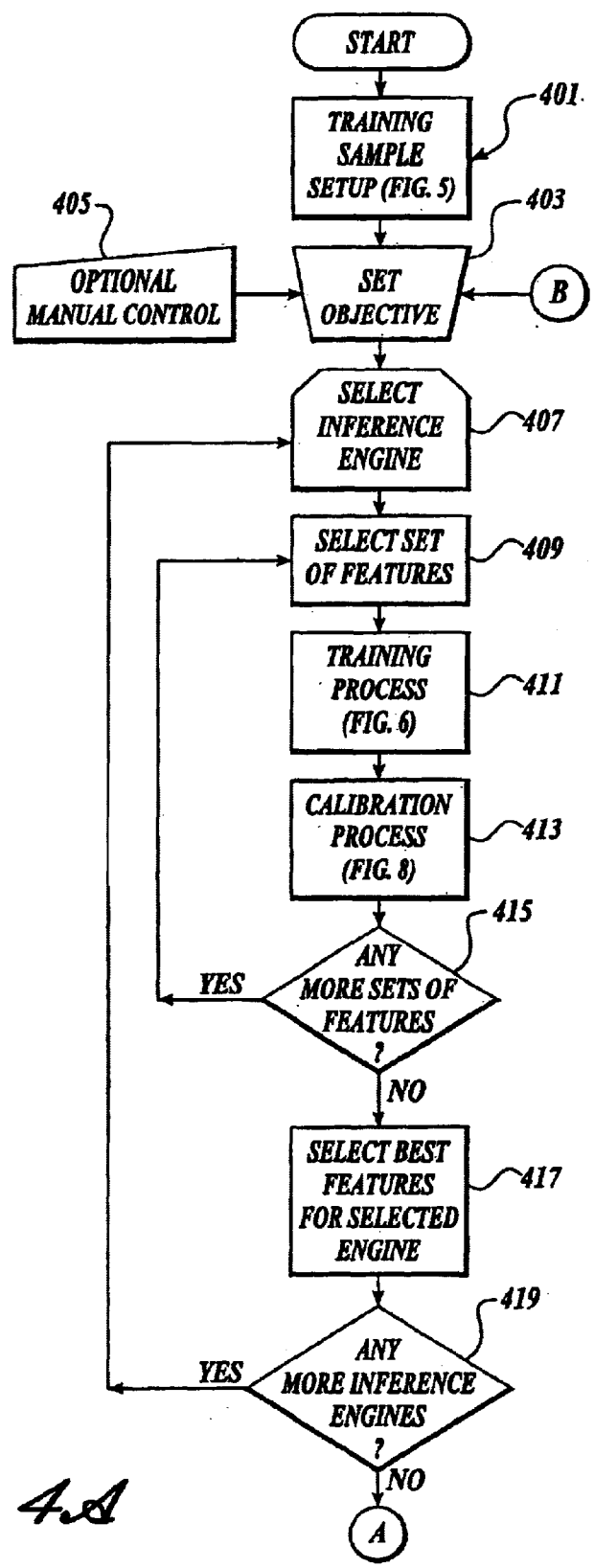
FIGS. 4A and 4B are functional flow diagram illustrating an overview of the main process of the invention.
Figure 4B:
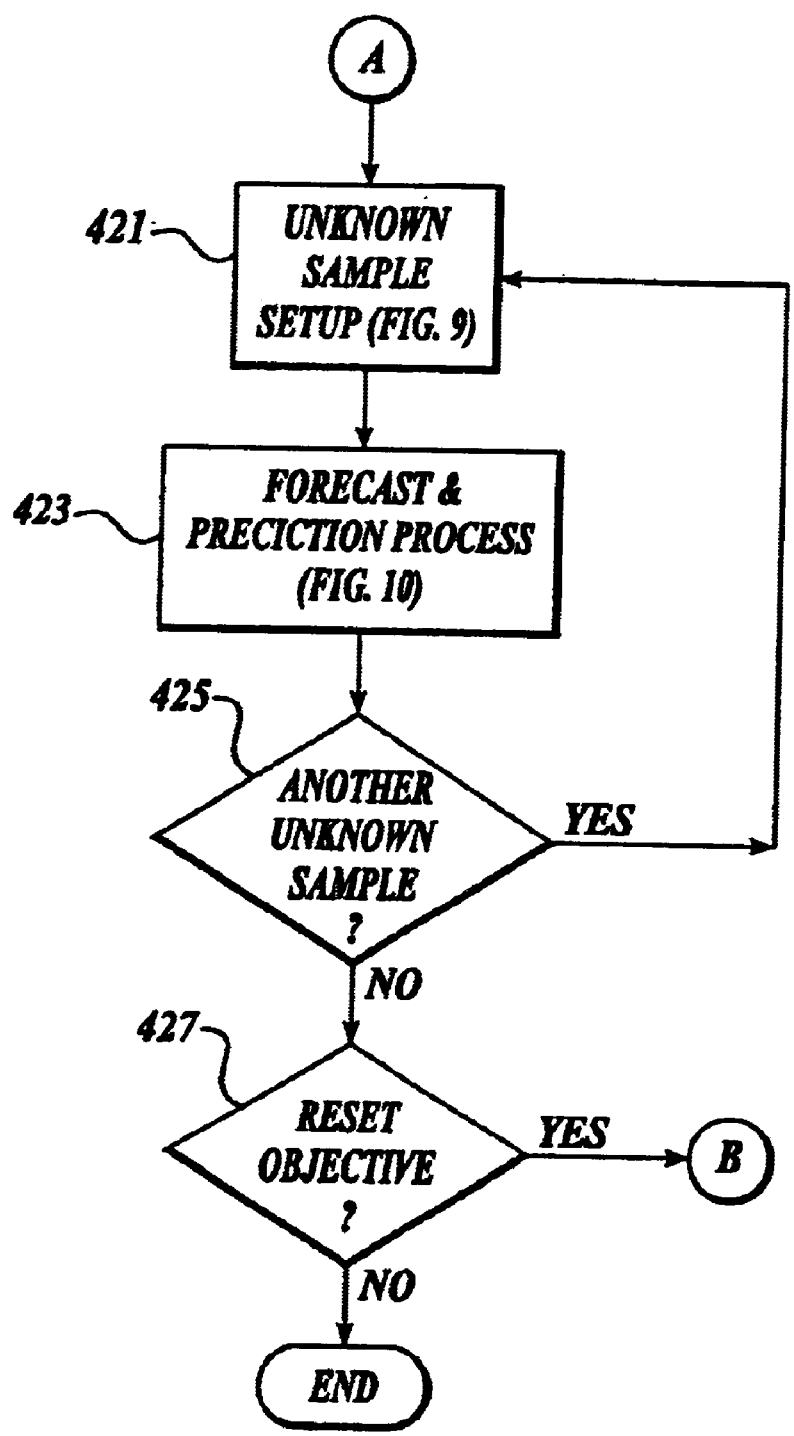

FIGS. 4A and 4B form a functional flow diagram illustrating a computer-implementable method formed in accordance with this invention for selecting which inference engine of a plurality of inference engines to use in predicting the categories into which individuals fall and producing forecast reports based on the predictions.

While, for ease of illustration and understanding, the computer-implemented method of the invention shown in FIGS. 4A and 4B is shown as a single process, an actual embodiment of the invention will likely take a different form comprised of modules, some residing on a client computer and others residing on one or more server computers. Thus, the following description should be taken as exemplary, not limiting.

Initially, as shown by block 401, a training sample is set up. As will be better understood from the following description of an example of a training sample setup process, setting up a training sample involves defining and naming categories and identifying a source of data for each defined category, i.e., a source of data that contains profile feature information (i.e., data) regarding individuals that fall in the defined categories. The data source must associate the profile data with the categories. The training sample setup 401 also involves assembling the data into a predetermined data structure.

After the training sample is set up, the objective to be met is defined. See block 403. The objective can be previously established or optionally inserted via manual control 405. As noted above, while the usual objective will be maximum predictive accuracy, other objectives can be set, such as minimizing category misclassification. Overall accuracy is typically maximized when errors in classification among categories are balanced.

After the objective has been set, a first inference engine is selected at 407. As will be better understood from the following description, the invention is architected with Bayes Rule as a framework. This allows any "inference engine" to be formalized in the same context. Bayes Rule effectively says that for a particular individual observation, that observation should be assigned to the category to which the observation has the maximum probability of belonging. The values of the independent variables, i.e., the individual profile features, are used to calculate these probabilities using a variety of inference engines. The inference engines are, in effect, algorithms that make the assumption that independent variables for a given category are distributed according to some probability density function. The most accurate inference engine will typically be the one for which the data are most closely modeled by the assumed probability density function. The presently preferred probability density functions are (a) normal with equal variances among categories that results in a linear decision surface, (b) normal with unequal variances among categories that results in a quadratic decision surface, and (c) Parzen that results in a polynomial decision surface.

Decision rule analyses depend upon the recognition of underlying patterns differing among categories of objects. A set of p-features (a p-tuple or vector in p-space) measured on an individual provides a description of that individual. A training sample of p-tuples for a number of individuals from one category establishes a region in p-space characteristic of that category of individuals. Training samples from individuals of different and known categories establish regions in p-space which may be separated by decision surfaces. These regions can be described mathematically by multivariate probability density functions. An individual whose category membership is unknown may be classified according to which region its p-tuple occupies. Determination of this region requires that the value of the probability density function for each category is calculated at the point defined by the p-tuple of the unknown individual. The largest result determines the category to which the individual is assigned; the probability that the unknown individual belongs to this category is apparently the largest. The decision surface is defined as the boundary along which values of the density functions are equal.

Decision surfaces may be "shifted" by multiplying the values of the density functions by an a priori probability value. Empirically, it is preferable to adjust the values of the a priori probabilities so that the percentage of individuals belonging to a certain category that were assigned incorrectly to all other categories approximately equals the percentage of individuals from all other categories assigned incorrectly to that specific category. This avoids situations where large numbers of misclassifications in one direction cause a decrease in overall classification accuracy. By shifting the decision surface, the number of these misclassifications may be decreased dramatically, while the corresponding misclassifications in the other direction are not significantly increased. Accuracies are generally higher than if a priori probabilities are left equal. Of course, the a priori probabilities can be adjusted to maximize an arbitrary objective function, such as profit. For example, when the benefits and costs are known for each category, estimated profit is a linear function of the decision array and these benefits and costs. There exists a set of a priori probabilities that will result in values for elements of the decision array that maximize profit. With empirical data, these values can be determined iteratively.

Returning to FIG. 4A, after the first inference engine is selected, a set of profile features are selected 409. This step is included so that independent variables (individual profile features) that are not different among categories can be eliminated. Preferably individual profile features are sorted based on standard statistics after controlling for multicolinearities. In addition to eliminating independent variables for which there is insufficient data for estimation, less significant individual profile features can also be eliminated if desired. The end result is one or more sets of profile features. At step 409 one set is selected.

Figure 6:
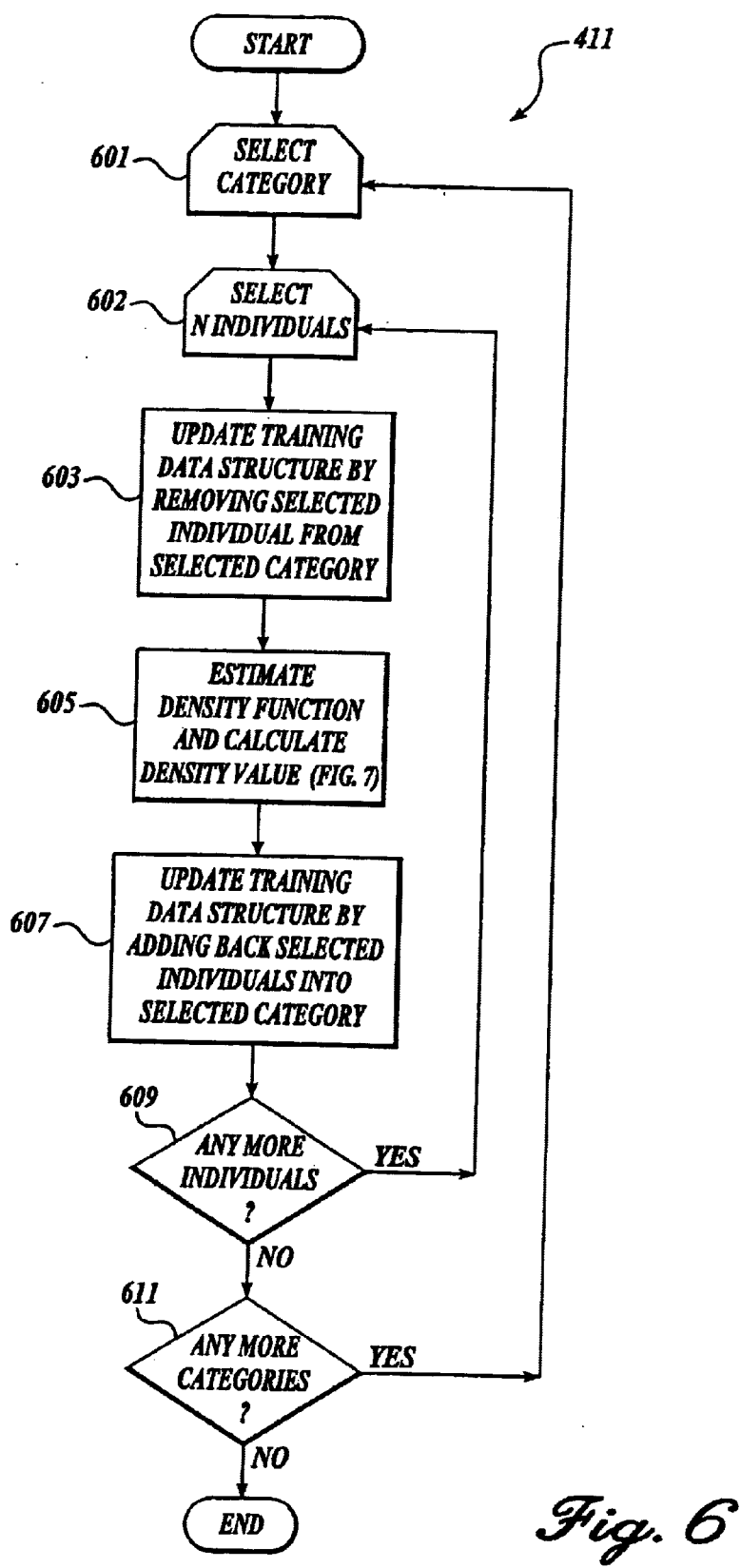
FIG. 6 is a functional flow diagram of a training process suitable for use in the main process illustrated in FIGS. 4A and 4B.

After the inference engine and set of profile features have been selected, a training process is conducted 411. An example of a training process formed in accordance with the invention is illustrated in FIG. 6 and described below. In general, during the training process, various probability density functions are estimated for the selected engine and a data structure containing unbiased density values is created.

Figure 8:
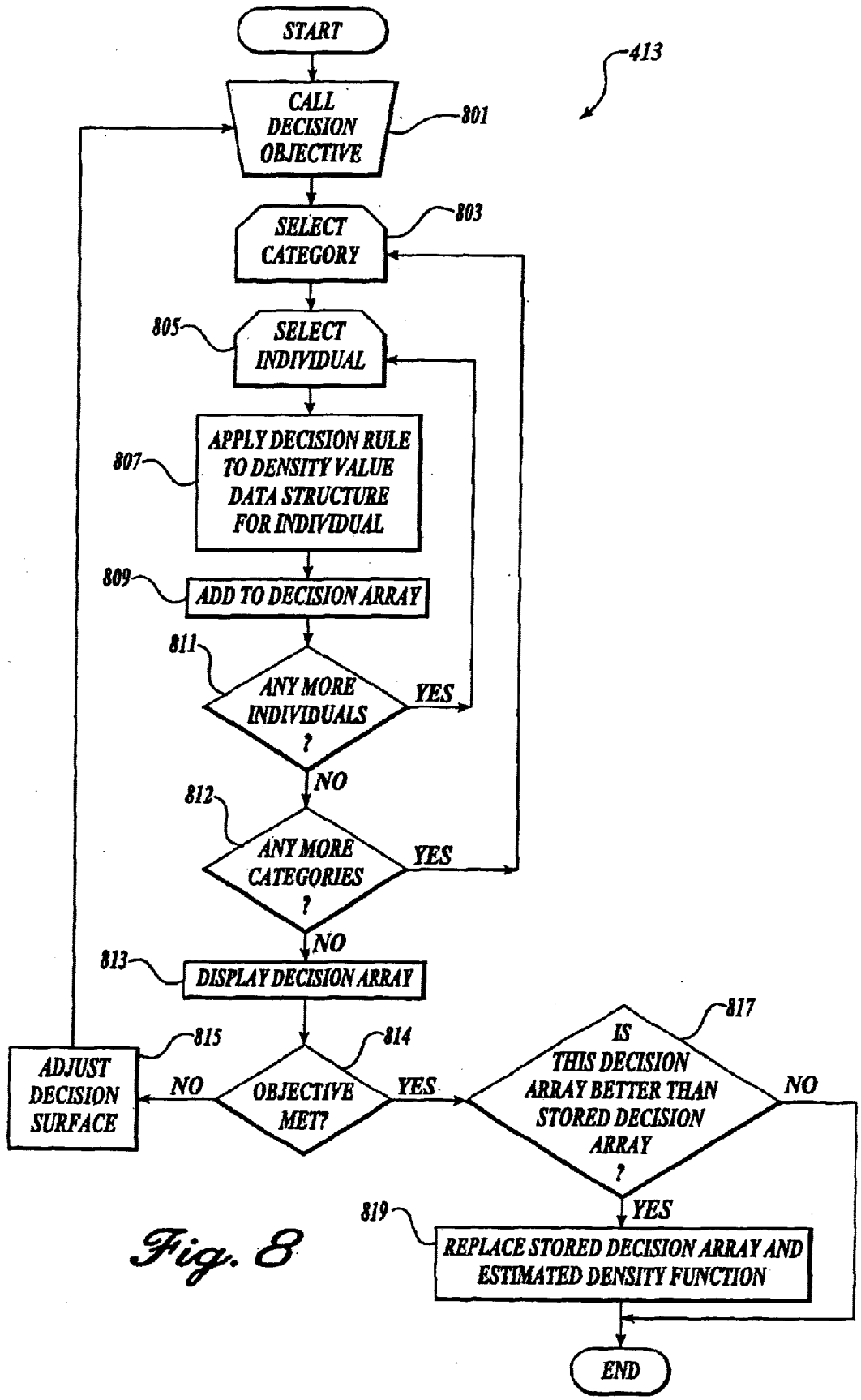
FIG. 8 is a functional flow diagram of a calibration process suitable for use in the main process illustrated in FIGS. 4A and 4B.

After the training process 411 is completed, a calibration process 413 is performed. An example of a calibration process formed in accordance with the invention is illustrated in FIG. 8 and described below. The calibration process creates a decision array in which are stored the results of classifying the individuals whose individual profile features were contained in the training sample. As will be better understood from the following description, the decision array compares an individual's true category to the category predicted by the selected inference engine. The decision array in combination with the estimated density function and density value data structure contain all the algorithms and parameters necessary for implementation of the selected engine.

After the calibration process has been completed for the selected engine, a test 415 is made to determine if any more sets of features need to be processed for the selected inference engine. If so, the next set of features is selected and the training and calibration processes 411 and 413 are repeated. If no more sets of features need to be processed, the set of features for the selected engine that best meets the desired objective are selected 417. Then a test is made to determine if any additional inference engines are to be selected. If so, as shown by decision block 415, the foregoing process is repeated, i.e., another inference engine is selected 409, a set of features is selected 409, and the training process is performed 411, followed by the calibration process 413. The foregoing sequence is repeated until no more inference engines remain to be selected.

Preferably, as each inference engine is processed, the resulting decision array is analyzed during the calibration step to determine if the current inference engine is better than previously processed inference engines. If so, the array and the estimated density function for the current inference engine replace previously stored decision array and estimated density function data. If the current inference engine is not better, the previously stored decision array and the estimated density function data is retained and this data for the current inference engine is discarded. Thus, after the training and calibration processes are complete for all inference engines, the decision array and estimated density function for the best inference engine are stored.

Figure 9:
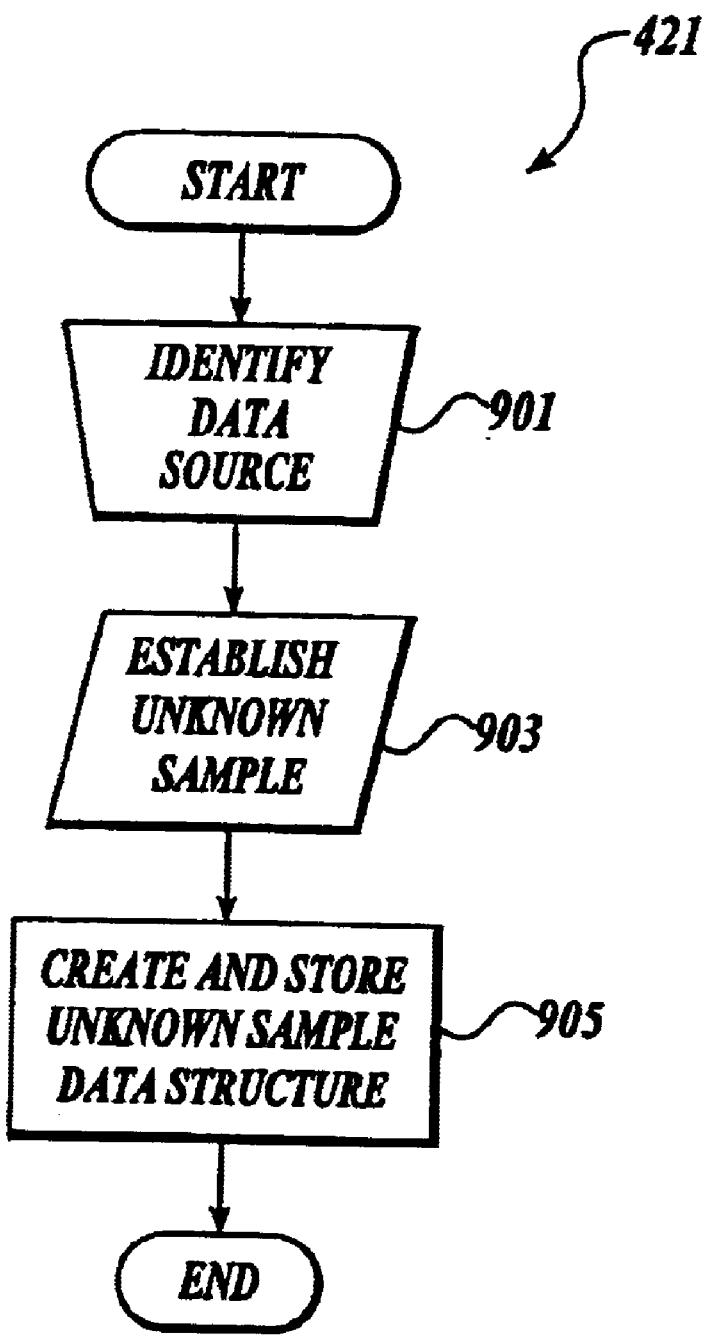
FIG. 9 is a functional flow diagram of an unknown sample setup suitable for use in the main process illustrated in FIGS. 4A and 4B.

After the best inference engine has been selected in the foregoing manner, a sample comprising individual observations for which category membership is unknown is identified. The unknown sample contains the same independent variables (individual profile features) as did the training sample and is set up 421 in generally the same manner as the training sample was set up 401. An example of an unknown sample setup process formed in accordance with this invention is illustrated in FIG. 9 and described below. Thereafter, each individual in the unknown sample is assigned to a category using the previously developed and stored estimated density function associated with the selected best inference engine. Each such assignment is called a prediction. The predictions are tallied and the tally adjusted for error rates determined by the decision array created during the calibration process described above. The result is a forecast. See block 423. Next, a test 425 is made to determine if another unknown sample is to be analyzed. If so, the foregoing steps are repeated. After all unknown samples have been examined, the user can determine 427 if the objective needs to be reset. If the objective needs to be reset, the objective is reset and the entire process is repeated. If not, the process ends.

Figure 5:
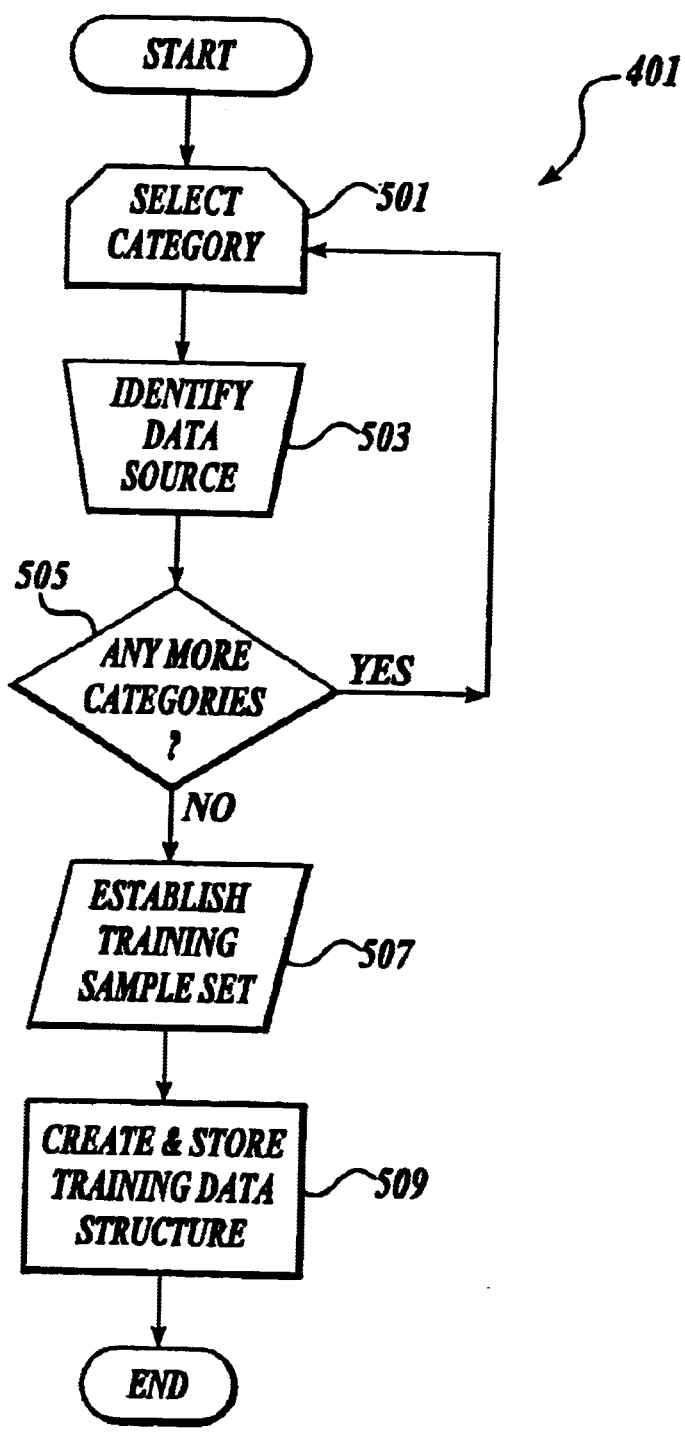
FIG. 5 is a functional flow diagram of a training sample set up suitable for use in the main process illustrated in FIG. 4.

FIG. 5 illustrates a training sample setup process 401 formed in accordance with the present invention. Initially, categories are selected 501. As noted above, selecting categories involves defining the categories and naming them, i.e., buyer/non-buyer, responder/non-responder, responder/non-responder/unsubscribe, sick/healthy, friend/foe, etc. Category names are normally entered into a computer system by a user via a graphical user interface (GUI), also called a dialog window. Next, for a selected category a data source is identified. The data source may be as simple as a manually preformatted file. Alternatively, and more likely, the data source is a source of data developed by profiling Internet customers. The data source must include independent variables, i.e., individual profile features and an associated dependent variable, i.e., the category into which a profiled individual falls. The data may be collected, for example, by advertising a product to a selected group of potential purchasers whose profile is known to the advertiser. The buy or no-buy results, combined with the potential purchasers' profile features, creates the data source for the selected category, i.e., buy or no-buy. Next, a test 505 is made to determine if any more categories have been entered by the user. If so, the next category is selected and a data source is identified, which may be the same data source.

After the data sources have been identified, a training sample set is established 507. This involves downloading data from the data source(s) and assembling the data into a computer file, or set of computer files, in a specific format, and storing the files in a workspace, i.e., in temporary memory. After establishing a training set in this matter, the downloaded data is converted into a training data structure having a predetermined configuration and the training data structure is stored in memory 509. A suitable training data structure is illustrated in FIG. 11. The profile features 1111a, 1111b, 1111c . . . 1111n of each individual 1113 in each category 1115 are included in the training data structure. As illustrated in FIG. 4A and discussed above, after the training data structure has been created, selected features of individuals may be eliminated. See step 409, FIG. 4A.

Figure 7:
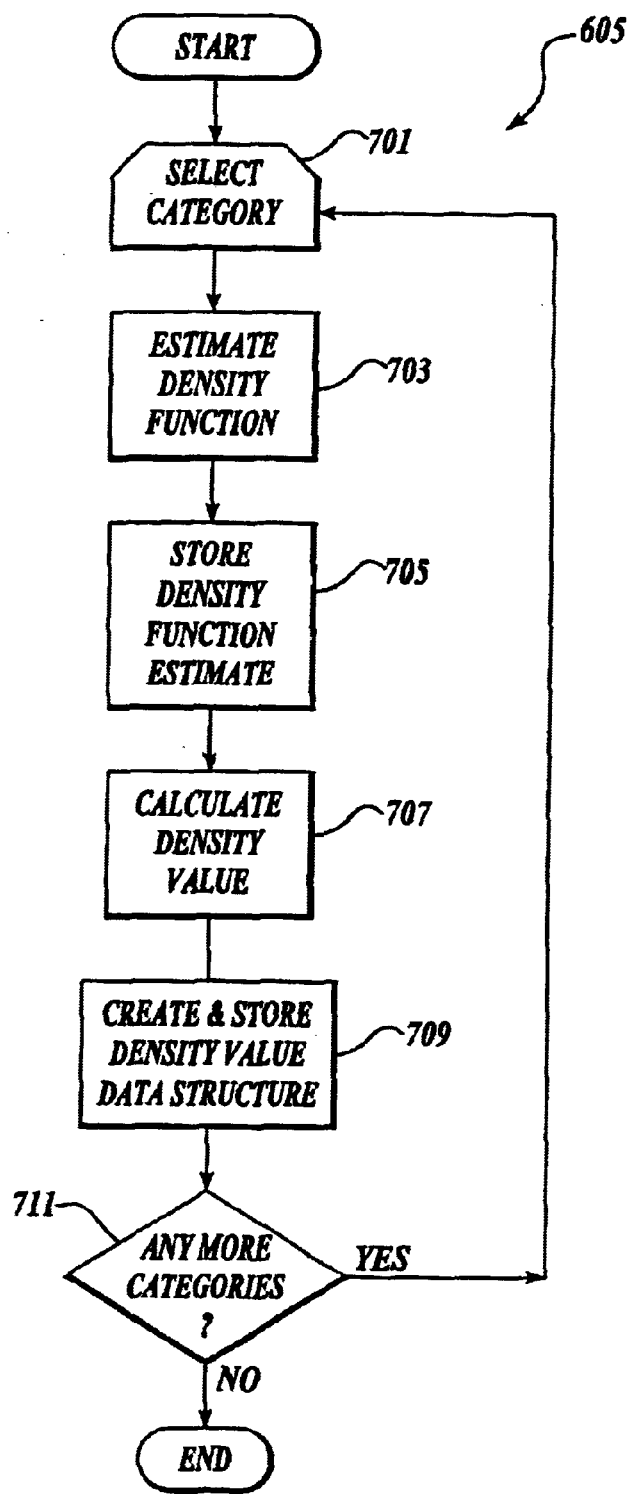
FIG. 7 is a functional flow diagram of an estimated density function and calculated density value process suitable for use in the training process illustrated in FIG. 6.

As noted above, FIG. 6 is a functional flow diagram of a training process 411 suitable for use in the process illustrated in FIG. 4A. First, one of the categories of the training data structure (FIG. 11) is selected. This may be accomplished by setting a pointer to the memory location of the data associated with the selection—in this case, the first category. Next, n individuals in the selected category are selected. Again, this may be accomplished by setting a pointer and offset to the memory location of the data associated with the selection—in this case, the first n individuals. Then, the training data structure is updated by removing the selected individuals from the selected category 603. Next, density function is estimated and a density value is calculated 605. A process formed in accordance with the invention for estimating density function and calculating density values is illustrated in FIG. 7 and described below. After the density function has been estimated and the density value has been calculated, the training data structure is again updated by adding back the selected individuals into the selected category. Thereafter, a test 609 is made to determine if there are any more individuals in the selected category. If so, the next n individuals are selected, for example, by incrementing the pointer and offset, and repeating the foregoing process (blocks 603, 605 and 607). When no more individuals remain to be selected, a test 611 is performed to determine if all categories have been selected. If there are more categories to select, the next selection is made by, for example, incrementing the pointer, and the entire process illustrated in FIG. 6 and described above is repeated. When no more categories remain to be selected, the process shown in FIG. 6 ends.

As noted above, FIG. 7 illustrates a density function and density value calculating process 605 suitable for use in the process illustrated in FIG. 6 formed in accordance with the invention. First, a category is selected 701 by, for example, setting a pointer to the memory location of the data associated with the selection—in this case, the first category. Then, the density function for the category is estimated 703. More specifically, the parameters for the density function for the selected category are estimated from the training data structure (FIG. 11). For example, in the case where a Gaussian density function is used, the mean for each selected feature (FIG. 11) and the variance-covariance matrix for these features are estimated within each category (FIG. 11). These estimates become the parameter values in the estimated Gaussian density function for each category. In this estimated Gaussian density function, there exists a variable for each selected feature. The thusly created estimated density function is stored 705. Then, the estimated density function for the selected category is used to calculate an estimated relative density value for the selected individual in the selected category 707. More specifically, using the foregoing example, the values of the selected features are substituted for the variables in the estimated Gaussian density function and a scalar is obtained. The result is used to create a density value data structure, which is stored 709. Then a test 711 is made to determine if any more categories exist. If more categories exist, the process is repeated. As will be recalled, the process illustrated in FIG. 7 occurs after the training data structure has been updated by removing a selected individual from a selected category. Thus, the density value data structure is for a selected individual in a selected category with the n individuals' data removed. An example of a density value data structure is shown in FIG. 12. For each category 1211 an estimate of the likelihood that each individual 1213 will fall in each category 1215a, 1215b . . . 1215n is included in the data structure.

As will be appreciated from the foregoing description, the density value data structure resulting from the process illustrated in FIGS. 6 and 7 is created using a leaving-n-out approach. This approach ensures that each observation's density value is estimated without the benefit of the values of its own independent variables. Thus, this approach prevents an individual observation from being used to classify itself. Further, this approach allows the intermediate values stored in the density value data structure to be subjected to Bayes Rule by the hereinafter-described classifier to obtain nearly unbiased estimates of error rates.

FIG. 8 illustrates a calibration process 413 formed in accordance with the invention. Initially, the decision objective set in the main process (FIG. 4A) is called 801. Next, a first category is selected 803. As with previous selections, this may be accomplished by setting a memory pointer to the data location associated with the first category. Next, an individual in the category is selected 805. Again, as with other selections, this can be accomplished by setting a memory pointer to the data location associated with the first individual. Next, a decision rule is applied to the density value data structure for the selected individual created in the manner described above in the selected category. Specifically, Bayes decision rule is applied to the selected individual. The result is added to a decision array 809. More specifically, the individual's result is added to the decision array shown in FIG. 13, which relates true and predicted categories. The true category is known by virtue of the training sample construction. Next, a test 811 is made to determine if any more individuals exist in the category. If so, the next individual is selected by, for example, incrementing the pointer, and the foregoing sequence repeated.

After all individuals have been selected, a decision rule applied to the density value data structure for the individual, and the result added to the decision array, a test 812 is made to determine if any more categories exist. If another category exists, the next category is selected by, for example, incrementing the pointer and the foregoing sequence is repeated. If no more categories exist, the decision array is displayed 813. Thereafter, the user determines if the objective has been met 814. If the objective has not been met, the decision surface is adjusted 815, which results in the decision objective being reset. As discussed above, the decision surface is adjusted (shifted) by multiplying the values of the estimated density function by an a priori probability value. The initial a priori probability value is one divided by the number of categories. Thereafter, the foregoing process is repeated.

If the user believes that the objective has been met, a test 817 is made to determine if the displayed decision array is better than a stored decision array obtained during prior cycles of the herein described process, or an initial zero array. If the displayed decision array is better than the stored array, the stored decision array and its related estimated density function are replaced 819 with the displayed decision array. If the displayed decision array is not better than the stored decision array, the display decision array is discarded.

Determining if the objective has been met is performed by checking the decision array to see if errors are balanced. While, preferably, all individuals are correctly categorized, this result does not occur in "real world" situations. Some individuals are incorrectly categorized. The decision array depicts the amount of incorrect categorization and thus can be used to determine if the desired objective has been adequately met. If not, as noted above, the decision surface is adjusted. As discussed above, the decision surface is adjusted or shifted by multiplying the values of the estimated density function by an a priori probability value. The objective is met once error rates are balanced, the results converge, or a finite number of iterations of the foregoing process have occurred.

The decision surface is adjusted or shifted if the number of individuals from a particular training sample (category) assigned in error to other categories exceeds the number of individuals assigned in error to the particular category from the training samples. This means that the a priori probability is decreased for the particular category.

As will be readily appreciated by those skilled in the art to which this invention pertains, in the real world, each category will have associated benefits and costs. These benefits may be tangible, as in the case of dollars, or intangible, as in the case of goodwill. Thus, for each element of the decision array there is a gain or loss that can be assigned to each individual within that element. The net gain or loss for each element of the decision array is the individual gain or loss multiplied by the number of individuals assigned to that element. The objective function is thus the sum of these net gains or losses.

FIG. 9 illustrates a training data setup process 421 formed in accordance with the invention. Initially, a data source is identified 901. This may be as simple as identifying a manually preformatted file, or this may involve an arbitrary complex database extraction. Typically, the extraction process is the same as for the training sample setup, except that category data is not required, only individual profile feature data. Next, as with training sample data, the extracted data is assembled into a computer file in a specific format and stored in a workplace (temporary memory) 903. Thereafter, the extracted assembled data is used to create an unknown sample data structure and the structure is stored. An example of an unknown data structure formed in accordance with this invention is illustrated in FIG. 14.

Figure 10:
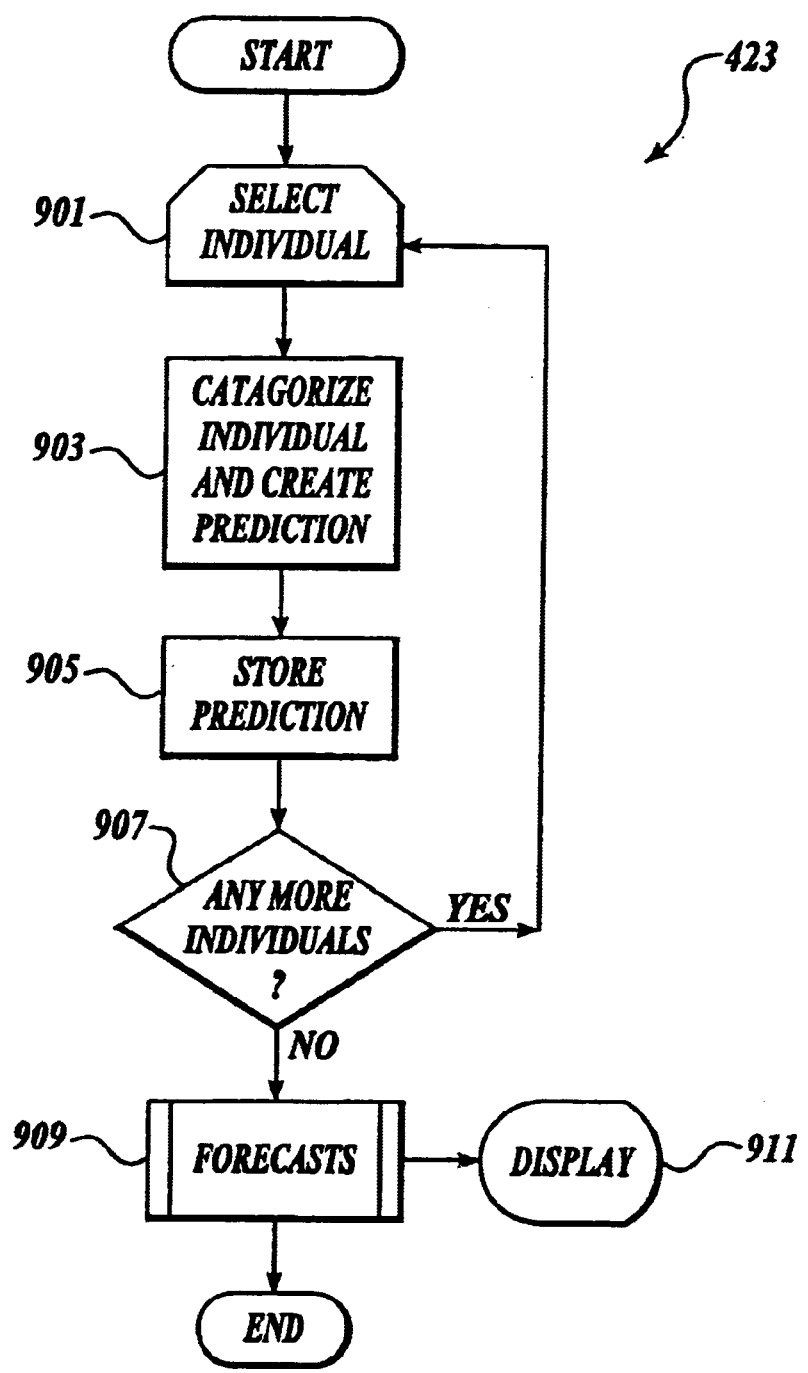
FIG. 10 is a functional flow diagram illustrating a forecast and prediction process suitable for use in the main process illustrated in FIGS. 4A and 4B.

FIG. 10 illustrates a forecast and prediction process 423 formed in accordance with the invention. Initially, an individual is selected 1001 from the unknown data structure (FIG. 14). As with other selections, this can be accomplished by setting a memory pointer to point to the first individual's data in the unknown data structure. Next, the individual is assigned to a category by the previously developed and stored values of the estimated density function together with the a priori probabilities as determined above. The resulting prediction is stored 905. Then a test 907 is made to determine if the data structure includes any more individuals. If the unknown data structure includes another individual, the individual is selected by, for example, incrementing the pointer and the foregoing process is repeated. If no more individuals exist in the unknown data structure, the results are tallied and a forecast report 909 is created. Forecasts are stored in a database and, if desired, displayed 911.

As will be readily appreciated from the foregoing description, the invention provides a computer-implementable method of selecting which inference engine of a plurality of inference engines to use to predict the categories into which individuals fall and produce forecast reports based on the predictions. That is, the selected engine is used to analyze unknown sample data to create predictions and produce forecast reports based on the predictions. The invention is ideally suited for use in connection with the Internet, particularly in connection with predicting the results of advertising campaign prior to instituting a full campaign by analyzing the results of a sample campaign that is used to create the training sample data that is used to select the best inference engine.

While the preferred embodiment of the invention has been illustrated and described, it will be appreciated that within the scope of the appended claims various changes can be made therein without departing from the spirit the invention.

The embodiments of the invention in which an exclusive property or privilege is claimed are defined as follows:

1. A method of selecting which inference engine of a plurality of inference engines to use to create an estimated density function and a decision array for use in predicting the categories into which individuals fall and produce forecast reports based on the predictions, said method comprising:
    a) a training process comprising
        1) sequentially applying training sample data that categorizes individuals based on the individuals' profile features to multiple inference engines to determine which inference engine is best based on a desired objective;
        2) creating an estimated density function and a density array for the best inference engine; and
        3) storing the estimated density function and decision array for the best inference engine; and
    b) an unknown sample data analysis process comprising:
        1) using the stored estimated density function and decision array for the best inference engine to analyze unknown sample data that includes the profile features of individuals and predict the categories into which individuals fall; and
        2) creating forecast reports based on the predicted categories.

2. The method claimed in claim 1 wherein:
    a) the individual profile features included in the training sample data are sorted into sets of individual profile features; and
    b) sequentially applying training sample data that categorizes individuals based on the individuals' profile features to multiple inference engines to determine which inference engine is best based on a desired objective includes:
        1) selecting a set of features for a selected inference engine;
        2) applying training sample data based on the selected set of features to the selected inference engine;
        3) creating an estimated density function for the selected inference engine; and
        4) repeating steps 1) through 3) until all sets of features have been selected.

3. The method claimed in claim 2 wherein the individual profile features are sorted into sets using standard statistics after controlling for multicolinearities.

4. The method claimed in claim 1 wherein the training process also comprises:
    a) identifying a data source for each category;
    b) establishing a training sample set; and
    c) creating and storing a training data structure based on the training sample set, said training data structure categorizing individuals based on the individuals' profile features.

5. The method claimed in claim 4 wherein, after the training data structure is created and stored, the training sample data is analyzed by sequentially applying the training data structure to multiple inference engines to determine which engine is best based on a desired objective.

6. The method claimed in claim 5 wherein:
    a) the individual profile features included in the training data structure are sorted into sets of individual profile features; and
    b) sequentially applying the training data structure to multiple inference engines to determine which inference engine is best based on a desired objective includes:
        1) selecting a set of features for a selected inference engine;
        2) applying a training data structure based on the selected set of features to the selected inference engine;
        3) creating an estimated density function for the selected inference engine; and
        4) repeating 1) through 3) until all sets of features have been selected.

7. The method claimed in claim 6 wherein the individual profile features are sorted into sets using standard statistics after controlling for multicolinearities.

8. The method claimed in claim 1, wherein after the training sample data is analyzed by sequentially applying a training data structure to multiple inference engines to determine which engine is best based on a desired objective.

9. The method claimed in claim 8 wherein the training sample data is analyzed using a leaving-n-out approach.

10. The method claimed in claim 9 wherein the leaving-n-out approach comprises:
a) selecting a category;
b) removing n individuals' data from the training data structure;
c) estimating a density function and calculating a density value for each category based on the training data structure with the n individuals' data removed;
d) reinserting the n individuals' data into the training data structure; and
e) repeating b) through d) until all individuals have been processed.

11. The method claimed in claim 10 wherein after a density function has been estimated and a density value calculated for each category for each individual with n individuals' data removed, repeating a) through f) of claim 10 for the next category.

12. The method claimed in claim 11 wherein the training data structure analysis continues until all categories have been processed.

13. The method claimed in claim 12 wherein the calculated density values are used to create a density value data structure.

14. The method claimed in claim 13 wherein after the density value data structure is created, for each category and each individual, a decision rule is applied to the density value data structure for the individual and the results are used to create the decision array.

15. The method claimed in claim 14 wherein after the decision array is created, the decision array is displayed so that a user can determine if the objective has been met.

16. The method claimed in claim 15 wherein, based on user input, adjusting the decision surface of the desired objective and, for each category and each individual, applying a decision rule to the density value data structure for the individual and using the results to create a new decision array.

17. The method claimed in claim 1 including, in response to user input, adjusting the decision surface of the desired objective.

18. A computer readable medium for carrying out the method of any one of claims 1–17.

19. A method of selecting which inference engine of a plurality of inference engines to use to create an estimated density function and a decision array for predicting the categories into individual falls and creating forecast based on the predictions, said method comprising:
a) setting up training sample data that categorizes individuals based on the individuals' profile features;
b) selecting an inference engine;
c) performing a training process on the training sample data to estimate a density function and create a density value data structure;
d) performing a calibration process on the density value data structure to create a decision array;
e) determining if another inference engine remain to be selected;
f) if any more inference engines remain to be selected, selecting another inference engine and repeating c) and d);
g) repeating b) through f) until all inference engines have been selected; and
h) using the estimated density function and the decision array to analyze an unknown data sample to create category predictions and forecasts based on the predictions.

20. The method claimed in claim 19 wherein:
a) prior to performing the training process a set of individual profile features is selected;
b) after performing the calibration process a test is made to determine if other sets of individual features remain to be selected;
c) if other sets of features remain to be selected, selecting another set of features and performing c) and d) of claim 18; and
d) repeating a) through c) of this claim until all sets of sets of features have been selected.

21. The method claimed in claim 19 wherein setting up training sample data comprises:
a) selecting a category;
b) identifying a data source for the selected category;
c) determining if any more categories exist;
d) if any more categories exist, selecting the next category and identifying a data source for that category;
e) repeating b) through d) until no more categories exist;
f) when no more categories exist, establishing a training sample set; and
g) creating and storing a training data structure based on the training sample set.

22. The method claimed in claim 19 wherein setting up the training sample data creates a training data structure.

23. The method claimed in claim 22 wherein the training process comprises:
a) selecting a category;
b) selecting n individuals;
c) updating the training data structure by removing the selected n individuals from the selected category;
d) estimating a density function and calculating a density value;
e) updating the training data structure by adding back the selected n individuals to the selected category;
f) determining if any more individuals exist;
g) if more individuals exist, selecting the next n individuals and repeating c) through f) until no more individuals exist;
h) when no more individuals exist, determining if any more categories exist; and
i) if more categories exist, selecting the next category and repeating b) through h) until no more categories exist.

24. The method claimed in claim 23 wherein estimating the density function and calculating the density value comprise:
a) selecting a category;
b) estimating a density function for the selected category;
c) storing the density function estimate;
d) calculating a density value;
e) creating and storing a density value data structure;
f) determining if any more categories exist; and
g) if more categories exist, selecting the next category and repeating b) through f) until no more categories exist.

25. The method claimed in claim 24, wherein the calibration process comprises:
a) selecting a category;
b) selecting an individual;
c) applying a decision rule to the density value data structured for the individual;
d) adding the results to a decision array;

e) determining if any more individuals exist;

f) if more individuals exist, selecting the next individual and repeating c) through e) until no more individuals exist;

g) when no more individuals exist, determining if any more categories exist;

h) if more categories exist, selecting the next category and repeating b) through f) until no more categories exist;

i) when no more categories exist displaying the decision array so that a user can determine if the objective has been met;

j) if the user decides that the objective has been met, determining if the current decision array is better than a stored decision array; and k) replacing the stored decision array and the estimated density function if the current decision array is better than the stored decision array.

26. The method claimed in claim 19 including setting up an unknown data sample.

27. The method claimed in claim 26 wherein setting up an unknown data sample comprises:

identifying a data source;

establishing an unknown data sample; and creating and storing an unknown sample data structure.

28. The method claimed in claim 19 wherein category predictions and forecast reports are created by:

a) selecting an individual;

b) predicting the category into which the individual falls;

c) storing the prediction;

d) determining if any more individuals exist;

e) if more individuals exist, selecting the next individual and repeating b) through d) until all individuals have been selected; and f) when all individuals have been selected creating a forecast report based on the predictions.

29. The method claimed in claim 19 including, in response to user input adjusting the decision surface of the desired objective.

30. A computer readable medium for carrying out the method of any one of claims 19–28.

* * * * *